United States Patent
Jin et al.

(10) Patent No.: US 6,185,190 B1
(45) Date of Patent: *Feb. 6, 2001

(54) METHOD AND APPARATUS FOR USING SYNTHETIC PREAMBLE SIGNALS TO AWAKEN REPEATER

(75) Inventors: Robert X. Jin; Eric T. West, both of San Jose; Kathy L. Peng, Union City; Stephen F. Dreyer, Los Altos Hills, all of CA (US)

(73) Assignee: LSI Logic Corporation, Milpitas, CA (US)

( * ) Notice: Under 35 U.S.C. 154(b), the term of this patent shall be extended for 0 days.

This patent is subject to a terminal disclaimer.

(21) Appl. No.: 09/240,788

(22) Filed: Jan. 27, 1999

Related U.S. Application Data

(63) Continuation of application No. 08/719,608, filed on Sep. 25, 1996, now Pat. No. 5,898,678.

(51) Int. Cl.$^7$ .................................................... H04J 3/14
(52) U.S. Cl. ..................... 370/246; 370/315; 370/401; 370/445; 375/211
(58) Field of Search ................................. 370/246, 274, 370/279, 315, 392, 401, 402, 419, 445, 501, 492, 522; 375/211

(56) References Cited

U.S. PATENT DOCUMENTS

| | | | |
|---|---|---|---|
| 4,402,082 | 8/1983 | Cope | 371/22 |
| 4,897,831 | 1/1990 | Negi et al. | 370/29 |
| 5,121,382 | 6/1992 | Yang et al. | 370/31 |
| 5,164,960 | 11/1992 | Winen et al. | 375/10 |
| 5,179,554 | 1/1993 | Lomicka et al. | 370/85.13 |
| 5,210,773 | 5/1993 | Schmid et al. | 375/4 |
| 5,414,708 | 5/1995 | Webber et al. | 370/85.3 |
| 5,444,740 | 8/1995 | Mizukami et al. | 375/286 |
| 5,467,369 | 11/1995 | Vijeh et al. | 375/224 |
| 5,499,269 | 3/1996 | Yoshino | 375/257 |
| 5,524,007 * | 6/1996 | White et al. | 370/419 |
| 5,533,054 | 7/1996 | DeAndrea et al. | 375/286 |
| 5,550,803 * | 8/1996 | Crayford et al. | 370/246 |
| 5,659,784 | 8/1997 | Inaba et al. | 395/726 |
| 5,719,856 | 2/1998 | May | 370/282 |
| 5,726,976 | 3/1998 | Thompson et al. | 370/229 |
| 5,740,174 | 4/1998 | Somer | 370/402 |
| 5,754,540 * | 5/1998 | Lin et al. | 370/315 |
| 5,898,678 * | 4/1999 | Jin et al. | 370/315 |

OTHER PUBLICATIONS

Clause 23 "Physical coding sublayer (PCS), physical medium attachment sublayer (PMA) and baseband medium, type 100BASE–T4", Supplement to IEEE Std. 802.3 100BASE–T, IEEE 802.3u, Jun. 12, 1995, pp. 59–138.

Clause 27, "Repeater for 100mb/s baseband networks", Supplement to IEEE Std. 802.3 100BASE–T, IEEE 802.3u, Jun. 12, 1995, pp. 189–220.

"10/100 Base–T4 Fast–Φ™ Transceiver", BCM5000–SP9 (Broadcom Corporation), Apr. 2, 1996, pp. 1–38.

(List continued on next page.)

*Primary Examiner*—Douglas W. Olms
*Assistant Examiner*—Shick Hom

(57) ABSTRACT

In a 100BASE-T4 protocol network, the "carrier_status" signal associated with an incoming packet on a PMA of a given port of a Clause 27 repeater is obviated and a direct connection between PMAs and a Clause 27 repeater in the network is eliminated by transmitting synthetic preamble signals over the PMA-Repeater Data Interface to the Clause 27 repeater corresponding to the given port at an early time prior to the time that the actual preamble information of the packet is transmitted over that data interface. Receipt of the synthetic preamble signals causes the repeater to awaken and to repeat the synthetic preamble signals to other ports of the repeater. In turn, the other ports become quiet in anticipation of data to be repeated from the given port to the other ports of the repeater.

8 Claims, 7 Drawing Sheets

OTHER PUBLICATIONS

"100Base–T4/10BASE–T Fast Ethernet Transceiver (CAT3)", Doc. No. 38–00415 (Cypress–CY7C971), pp. 7–42 to 7–65, Apr. 1995.

"10Mbps/100Mbps Lan Physical Layer Interface", (Intel–82553), pp. 1–60, Apr. 1995.

"100Base–T Specification", Presentation Reprints from IEEE 802.3 High–Speed Study Group, Fast Ethernet Alliance, Mar. 7, 1994.

* cited by examiner

MDI = MEDIUM DEPENDENT INTERFACE
MII = MEDIA INDEPENDENT INTERFACE
PCS = PHYSICAL CODING SUBLAYER
PMA = PHYSICAL MEDIUM ATTACHMENT
PHY = PHYSICAL LAYER DEVICE

NOTES:
  *MII is optional
  **AUTONEG communicates with the PMA sublayer through the PMA service interface messages PMA_LINK request and PMA_LINK indicate
  ***AUTONEG is optional

METHOD AND APPARATUS FOR USING SYNTHETIC PREAMBLE SIGNALS TO AWAKEN REPEATER

This application is a continuation of Ser. No. 08/719,608 filed Sep. 25, 1996, now U.S. Pat. No. 5,898,678.

BACKGROUND OF THE INVENTION

1. Field of the Invention

The present invention relates to integrated circuit technology and to integrated circuit use in data communications technology. More particularly, the present invention relates to data communications technology utilizing packet-type signaling systems. Applications of the present invention will be particularly suited to data communications protocols such as 100BASE-T4 Ethernet.

2. The Prior Art

Many modern data communications systems utilize data packet technology. Packet-based systems present particular challenges for designers of methods which can detect and correct for erroneous conditions. In packet-based data communications, data signals or symbols are collected into groups rather than being transmitted continuously. These groups are commonly known as packets or frames. Data transmitted and received in a packet-based system will be sent and received as a series of packets rather than as a continuous signal. This obviates the need to establish a direct and continuous connection between the transmitter and receiver, allowing greater flexibility in network design.

In order to preserve data addressing and integrity, as well as to allow data communications receivers to implement functions such as alignment and recovery, it is common practice in the art to encapsulate data being sent in a packet form: for a given group of data, signals or symbols designating the start of a packet are added before the data signals or symbols; signals or symbols designating the end of a packet are added after the data signals or symbols. Therefore, a packet will typically include data signals or symbols "surrounded" by non-data signals or symbols. Packets, then, will be comprised of both data components or elements and non-data components or elements.

The pre-data packet components or elements (comprised of non-data signals or symbols) are typically used (among other functions) to designate the presence of the following data, and are commonly known as "preambles". Those of ordinary skill in the art will recognize that the term "preamble" used in this context is intended to be inclusive; as such, it includes other common terms for pre-data packet components or elements, such as: start-of-stream delimiter (SSD), start-of-frame delimiter (SFD), and start-of-stream (SOS), for example. End of packet delimiters are commonly referred to as EPDs or EOPs (end-of-packet). The inventive concepts herein, as will be understood by those of ordinary skill in the art, are equally effective and applicable to preambles (pre-data packet components or elements) of any length or type.

Accordingly, the packet-type geometry may be designated:

<PREAMBLE><DATA><EPD>

It is well-known to those of ordinary skill in the art that both the preamble and the EPD may be used to carry important non-data information about the packet, such as timing, length, and error status, among others. Thus, a key function of receiving devices is the reception and use of these non-data packet elements.

It is also well-known to those of ordinary skill in the art that communication protocols define the form and use of preambles and EPDs; this allows a wide variety of communications equipment to communicate effectively. One of the major protocols used in the current development of Fast Ethernet technology is designated 100BASE-T4 Ethernet (or T4), defined by a Supplement to IEEE Standard 802.3u-1995, hereby incorporated herein by reference as if set forth fully herein. The T4 protocol calls for the transmission of data at an effective rate of 100 Mbits/sec. In order to maintain reliability of transmission over the conventional twisted pair medium, the 100BASE-T4 protocol requires that the transmission and reception be implemented over three pairs of twisted pair wires; this reduces the data transmission rate to one-third of 100 Mbits/sec, or approximately 33 MHz. The transmission rate is still further reduced by encoding the data according to the 8B6T protocol shown in FIG. 1. The 8B6T coding scheme maps data octets (8 bits, or 1 byte) of binary (1,0) data into ternary symbols (+,0,−). Each byte of data is mapped to a pattern of six ternary symbols, called a 6T code group. The 6T code groups are fanned out to the three independent serial transmission channels. The ternary symbol transmission rate, then, is six-eighths (6/8) of the channel data rate (about 33 Mb/s), or precisely 25 MHz. As will be apparent to those of ordinary skill in the art, the reduction in symbolic rate greatly improves potential data communications reliability over the multiple twisted pair medium.

FIG. 2 depicts a diagram of a type 100BASE-T4 physical layer device (PHY) relationship to the ISO Open Systems Interconnection (OSI) Reference Model and the IEEE 802.3 CSMA/CD LAN Model as described by Supplement to IEEE Standard 802.3u-1995 referred to above. In the diagram, the "MEDIUM" refers to the physical medium over which data is transmitted, in this case, four twisted pairs of wires. The "MDI" is a Medium Dependent Interface—an interface between the specific medium used (MEDIUM) and the Physical Layer Device (PHY). The PHY may include a Physical Medium Attachment (PMA), a Physical Coding Sublayer (PCS) and a Media Independent Interface (MII) along with an optional auto-negotiation (AUTONEG) function.

Physical level communication between PHY entities in a T4 network takes place over four twisted pairs. FIG. 3 shows a typical T4 connection between a first Node "A" or PHY entity and a second Node "B" or PHY entity of a T4 network wired in the optional repeater configuration with twisted pair crossovers as shown. Referring to FIG. 3, the four twisted pairs include two pairs used for bidirectional communications and designated at Node "A" as BI_D3 and BI_D4 as well as a pair used exclusively for A to B communication (TX_D1) and a pair used exclusively for B to A communication (RX_D2).

The Physical Coding Sublayer (PCS) serves the function of coupling an MII to a PMA as shown in FIG. 2. The PCS Transmit function accepts data nibbles (4-bit data segments) from the MII. The PCS Transmit function encodes these nibbles using an 8B6T coding scheme and passes the resulting ternary symbols to the PMA. In the reverse direction, the PMA conveys received ternary symbols to the PCS Receive function. The PCS Receive function decodes them into octets, and then passes the octets one nibble at a time up to the MII. The PCS also contains a PCS Carrier Sense function, a PCS Error Sense function, a PCS Collision Presence function, and a management interface.

FIG. 4 shows in block diagram form the division of responsibilities between the PCS, PMA and MDI layers. The MDI is shown at the right of FIG. 4 and the MII is shown at the left of FIG. 4.

Ethernet transceivers designed to the 100BASE-T4 standard will necessarily include means for 8B6T encoding/ decoding and recovery of the clock-data channels. The data will be encoded, fanned into the three transmission channels (3 of the 4 twisted pairs), and transmitted across the twisted pairs. At the receiving end, the data will be recovered from the three received channels, decoded, and sent into the receiving device.

In packet-based data communications systems, signals do not travel in continuous streams. Rather, data travels in small groups (of from about 64 to about 1500 bytes in the 100BASE-T4 Ethernet system), called packets or frames. Packets, then, are the basic unit of such data communications systems; all encoding, decoding and alignment functions are based on the packet geometry.

In order to delineate and signal the arrival and departure of packets, one or more preamble fields and closing fields are typically appended to each packet. The preamble and closing fields have known characteristics which can signal the receiving devices. As is known to those of ordinary skill in the art, it is through the reception of these signals that the decoding and alignment functions can be effectively implemented.

The T4 protocol defines the packet preambles to be used in a 100BASE-T4 system, and their order of usage. These frame elements are denoted as SOSA, SOSB, P3, and P4. SOSA is defined as the succession of six ternary symbols $\{+1, -1, +1, -1, +1, -1\}$ (also denoted "+−+−+−"), which is the result of the 8B6T encoding of the constant "sosa" (start of signal A). SOSB is defined as the succession of six ternary symbols $\{+1, -1, +1, -1, -1, +1\}$ (or "+−+−−+"), which is the result of 8B6T encoding of the constant "sosb" (start of signal B). P3 is defined as the succession of two ternary symbols $\{+1, -1\}$ (or "+−"). P4 is the succession of four ternary symbols $\{+1, -1, +1, -1\}$ (or "+−+−").

FIG. 5 shows the 100BASE-T4 standard usage for these preamble elements. The RX_D2 receive pair preamble contains (in order of reception) two successive SOSA frame elements and an SOSB frame element. The BI_D4 receive pair preamble contains (in order of reception) a P3 frame element, two successive SOSA frame elements, and an SOSB frame element. The BI_D3 receive pair preamble contains (in order of reception) a P4 frame element, an SOSA frame element, and an SOSB frame element.

It is well known to those of ordinary skill in the art that the SOSB frame element is the key element for a 100BASE-T4 receiver. It is the SOSB frame element that signifies the transition between preamble and data; thus, it is the unique point at which the data streams can be aligned and/or decoded.

Those of ordinary skill in the art recognize that speed of data throughput is critical to packet-based data communications systems. Systemic features which unnecessarily take time to perform degrade overall systems performance and should be eliminated where feasible.

A typical packet-based data communications system comprises any number of elements, but a common element which many such systems include is the star topology repeater or hub.

FIG. 6 depicts a simplified version of such a "hub" in a star topology for a local area network (LAN). Many LANs consist of nothing more than a series of devices connected to one another through such a hub. The simple network of FIG. 6 includes a hub repeater at the center of a star topology and connected to nodes A, B, C and D of the network.

Repeaters (hubs) for use in T4 networks are defined in Clause 27 "Repeater for 100 Mb/s baseband networks" of Supplement to IEEE Standard 802.3u-1995, referred to above. The purpose of the repeater is to provide a simple, inexpensive, and flexible means of coupling two or more segments of a LAN.

FIG. 7 depicts the 100 BASE-T4 repeater set relationship to the OSI reference model for a Clause 27 repeater under IEEE 802.3. In essence the repeater function may communicate with the respective PCS elements in PMA elements of the PHY elements of two or more network elements. For a "dumb" repeater which simply repeats what it is told, it is best to have the repeater communicate directly with the PMA and avoid data translation tasks to convert PMA signals to PCS signals and vice versa. Accordingly, the fastest "dumb" repeaters communicate directly between PMA elements of network devices.

FIG. 8 depicts in block diagram form the operative elements connecting the Medium Dependent Interface (MDI) with the PMA service interface of a 100 BASE-T4 device. As can be seen in FIG. 8, incoming signals on the RX_D2 receive pair are passed to a PMA carrier sense function 14 which detects the presence of a packet signal and, upon such detection, asserts the "carrier_status" signal. When carrier_status is set to "ON", this means that a packet is in the process of being received—when it is "OFF", this means that the system is between the receipt of packets.

In practice, manufacturers of Ethernet products which implement the specification set forth in the Supplement to IEEE Standard 802.3u-1995 do so by manufacturing semiconductor devices or chips which implement functions such as a media interface adapter, a repeater, etc. One purpose of the IEEE Standard is to clarify and specify the signals that such devices should generate so that they will work together.

In circuits which are integrated onto a semiconductor chip, the number of connectors to off-chip circuits, sometimes referred to as "pins", is often limited. The number of pins may be limited due to the size of the chip, due to the added expense of packaging the chip so as to have an increased number of pins, or due to a requirement for downward compatibility with a previous product. In each of these cases, it is desirable to provide the same functions using fewer pins, or to provide more functions using the same number of pins.

In the prior art, it is necessary to devote a separate pin of both a media interface adapter chip and a repeater chip to communication of the carrier_status signal. In the Clause 27 repeater this signal is referred to as "scarrier_present (X)" referring to a signal received from the PMA of a device on port "X" of the repeater over a specific electrical connection other than the PMA-Repeater Data Interface 10 (FIG. 7). A purpose of this signal is to give the repeater client the earliest reliable indication of activity on the underlying medium so that (1) the circuitry can "wake up" so as to be fully functional by the time the data portion of the packet is received and (2) the repeater can know that the PMA associated with a particular port is active and thus signal the other ports of this condition so that activity on these other ports does not start until the packet has been handled—this avoids collisions during the repeat function of re-sending the signal received on port x to the other ports of the repeater.

The 100BASE-T4 protocol requires that the receiver function pass the SOSB frame element only when the data streams are fully aligned. Thus, the data streams will be received at the interface only after the SOSB frame element is: (1) detected by the receiver function, indicating alignment; and, (2) sent to the interface by the receiver function.

As will be known to those of ordinary skill in the art, an important element of modern high-speed data communications is reducing the amount of time required to implement non-data functions such as alignment and decoding. Therefore, those of ordinary skill in the design of Ethernet data communication devices are acutely aware of the potential for time "lag" between data packets. In the 100BASE-T4 system, the time it takes to transmit/receive one bit of data, called bit time, is 10 ns. Since it takes six (6) ternary symbols to send a SOSB, then the total time required to send an SOSB is 24 bit time, or 240 ns.

In the prior art, the receive function waits until the SOSB is detected before sending the SOSB to the interface. Thus, the data cannot be sent until at least 240 ns after the SOSB is detected by the receiver. While this is acceptable when the carrier_status signal is available, it is unacceptable in the absence of the carrier_status signal.

Accordingly, under prior art schemes, if the carrier_status signal is not passed to the repeater, by the time that the <DATA> portion of the packet arrives at the repeater over the PMA-Repeater Data Interface 10, the repeater will likely not be sufficiently "awake" and the other ports of the repeater may be active causing unnecessary data collisions and unnecessary slowing of the operation of the network under busy conditions. It is thus desirable to have an alternative method of signalling the repeater that one of its ports is active at the earliest opportunity without depending on the carrier_status signal.

SUMMARY OF THE INVENTION

In a 100BASE-T4 protocol network, the "carrier_status" signal associated with an incoming packet on a PMA of a given port of a Clause 27 repeater is obviated and a direct connection between PMAs and a Clause 27 repeater in the network is eliminated by transmitting synthetic, preamble signals over the PMA-Repeater Data Interface to the Clause 27 repeater corresponding to the given port at an early time prior to the time that the actual preamble information of the packet is transmitted over that data interface. Receipt of the synthetic preamble signals causes the repeater to awaken and to repeat the synthetic preamble signals to other ports of the repeater. In turn, the other ports become quiet in anticipation of data to be repeated from the given port to the other ports of the repeater.

OBJECTS AND ADVANTAGES OF THE INVENTION

An object and advantage of the present invention is to permit PMA device implementations to be fully operable with Clause 27 repeaters without the need for a separate pin to carry the carrier_status signal from the PMA device to the repeater device.

Another object and advantage of the present invention is to provide a novel method of signalling from a PMA of a PHY entity on a 100BASE-T4 network to a corresponding Clause 27 repeater the proximity of a data transmission from the PHY entity to the repeater over the PMA data interface so as to allow the circuitry to "awake" and other ports of the repeater to become quiet in anticipation of the data transmission.

These and many other objects and advantages of the present invention will become apparent to those of ordinary skill in the art from a consideration of the drawings and ensuing description of the invention.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

In accordance with the present invention, a hardwired connection specified in Supplement to IEEE Std. 802.3-u (1995) corresponding to the 100BASE-T4 specification is eliminated without the loss of functionality or compatibility with mating devices. The connection eliminated was designed to transmit the "carrier_status" signal from the PMA corresponding to the MEDIUM attached to port(x) of a Clause 27 repeater to the repeater device so that the repeater can inform all other ports of the repeater to go quiet in anticipation of imminent packet traffic over port(x).

Figure 7:
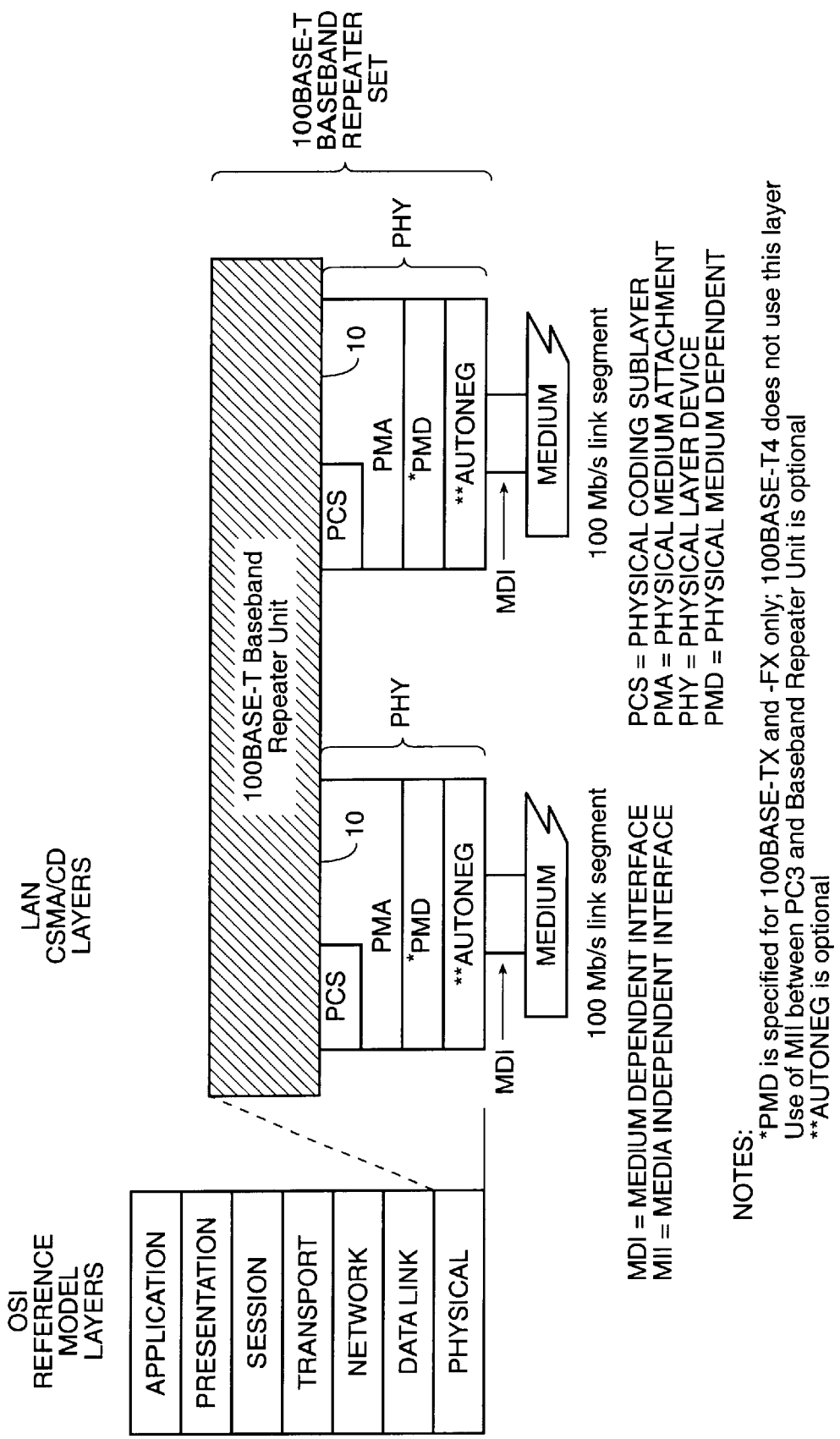
FIG. 7 is a block diagram showing the 100BASE-T4 repeater set relationship to the OSI Reference Model.

Under the T4 protocol, when a preamble signal is sent over the PMA-Repeater Data Interface 10 (FIG. 7) of port(x) in the absence of assertion of the corresponding carrier_status signal, the port(x) "wakes up" and the repeater repeats the preamble signal to the other ports (other than port(x)). As a result, these other ports eventually go quiet in order that the data to be sent will be able to be repeated over all ports without collision.

The transmission of a preamble or partial preamble signal other than the actual preamble signal (hereinafter referred to as a "synthetic preamble signal"), such as a P3 signal (+,−), a P4 signal (+,−,+,−) or a repeating sequence of such signals other than SOSB (+,−,+,−,−,+) which advises that the start of data is the next thing that will be transmitted, or an end of packet code which advises that the packet transmission is complete, over the PMA-Repeater Data Interface has no data effect in that no erroneous data is transmitted—the content of such preamble signals is ignored, but the presence of the signal serves, in effect, the same purpose as the carrier_status signal—without utilizing a pin of a PMA chip and a corresponding pin on a repeater chip.

The desired early synthetic preamble signal is thus transmitted by the PMA in response to assertion of the carrier_status signal within the PMA. Any method of transmitting the synthetic preamble signal over the PMA-Repeater data interface is suitable. Some presently preferred examples include storing the synthetic preamble signal in a register or in memory or as an executable program within the PMA device and transmitting the synthetic preamble signal over the PMA-Repeater Data Interface upon assertion of the carrier_status signal. Since the P3 signal, repeated or the P4 signal, repeated would suffice, many easy implementations would be apparent to those of ordinary skill in the art. The synthetic preamble signal is preferably sent continuously until just before the time that the actual packet preamble is ready to be transmitted over the PMA-Repeater Data Interface. This event can be and is preferably triggered by the completion of the PMA data alignment function which corresponds to the time when the complete data packet (including <PREAMBLE><DATA><EPD>) is ready to be sent from the PMA to the repeater.

Figure 1:
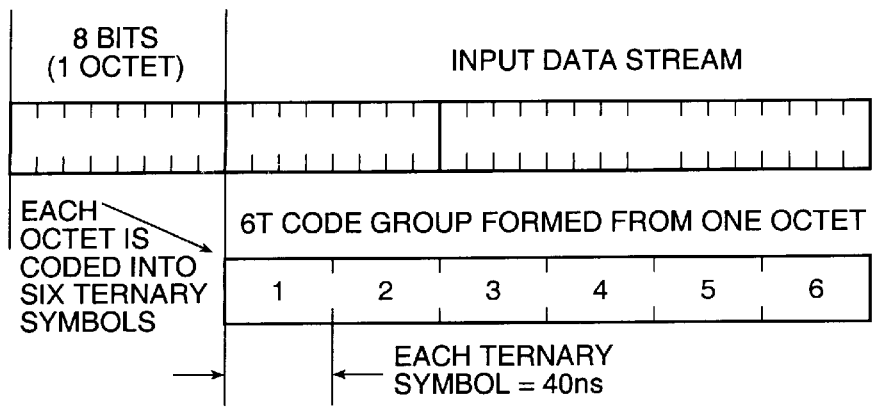
FIG. 1 is a diagram showing conversion of 8-bit binary data octets to 6T ternary code groups.
Figure 2:
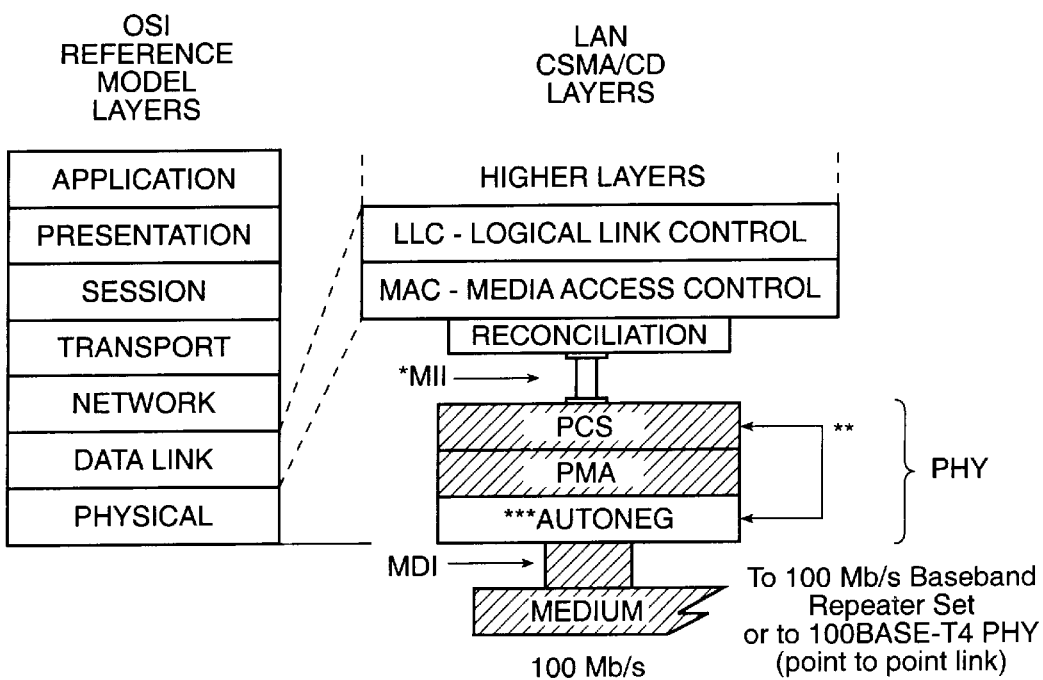
FIG. 2 is a block diagram showing the type 100BASE-T4 PHY relationship to the ISO Open Systems Interconnection (OSI) Reference Model and the IEEE 802.3 CSMA/CD LAN Model.
Figure 3:
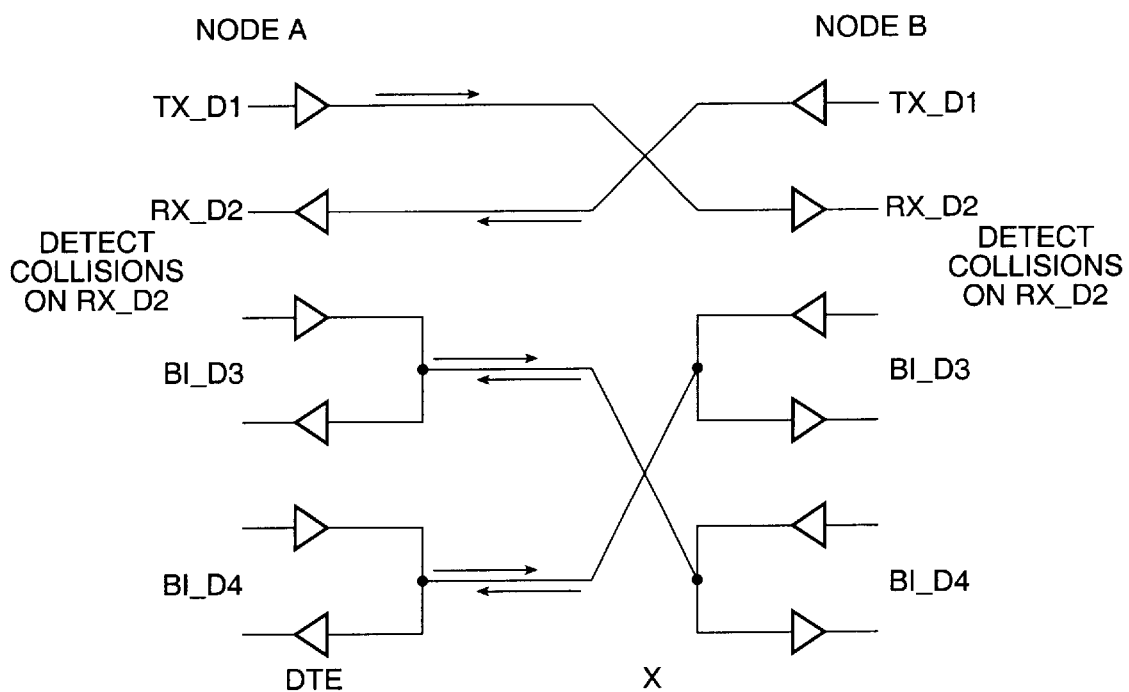
FIG. 3 is a diagram showing 4 wire pairs connected as in a connection between two nodes of a T4 protocol network wired as for repeater operation.
Figure 4:
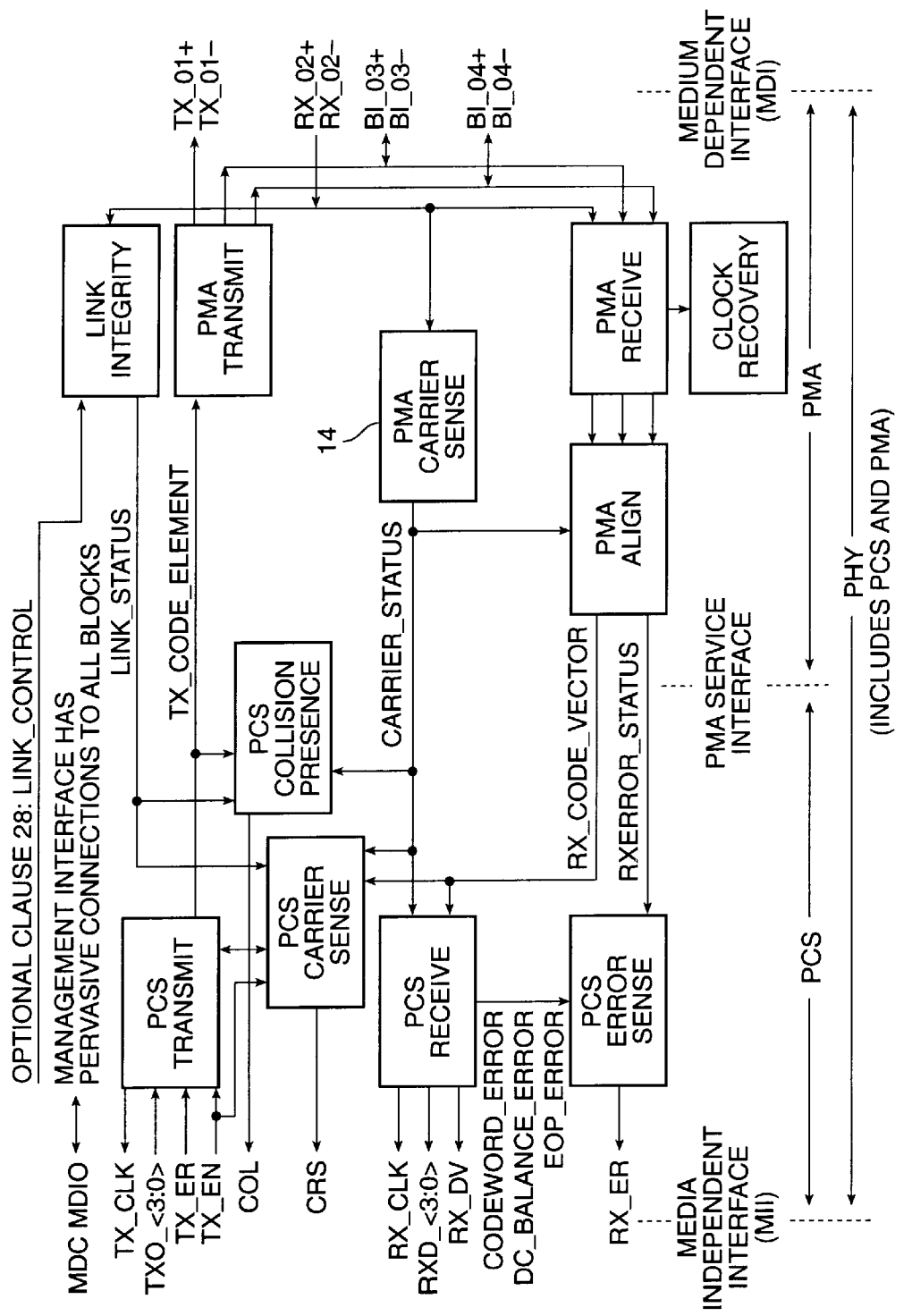
FIG. 4 is a block diagram showing the division of responsibilities between a 100BASE-T4 PCS and a corresponding PMA.
Figure 5:
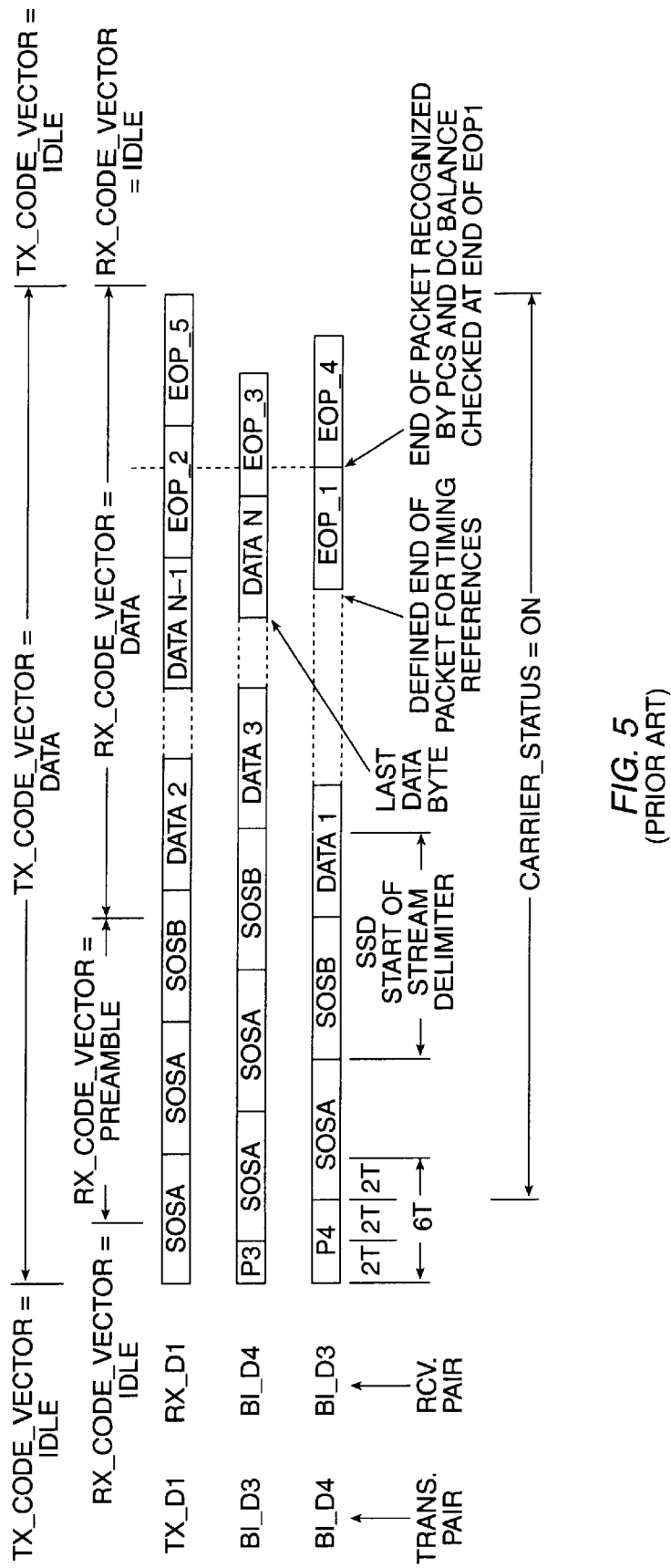
FIG. 5 is a diagram showing the arrangement of packet preambles, data, and end of packet delimiters in a PCS sublayer to PMA sublayer frame structure.
Figure 6:
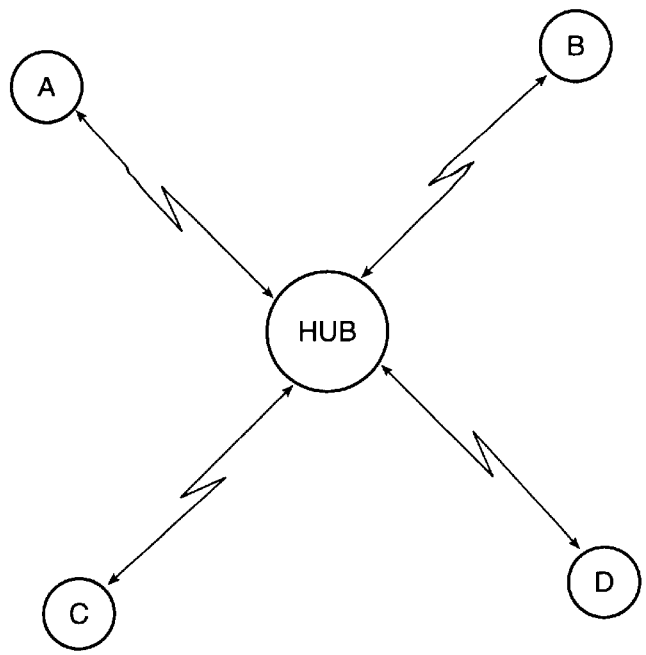
FIG. 6 is a diagram of a simple repeater/hub arranged in a star topology network.
Figure 8:
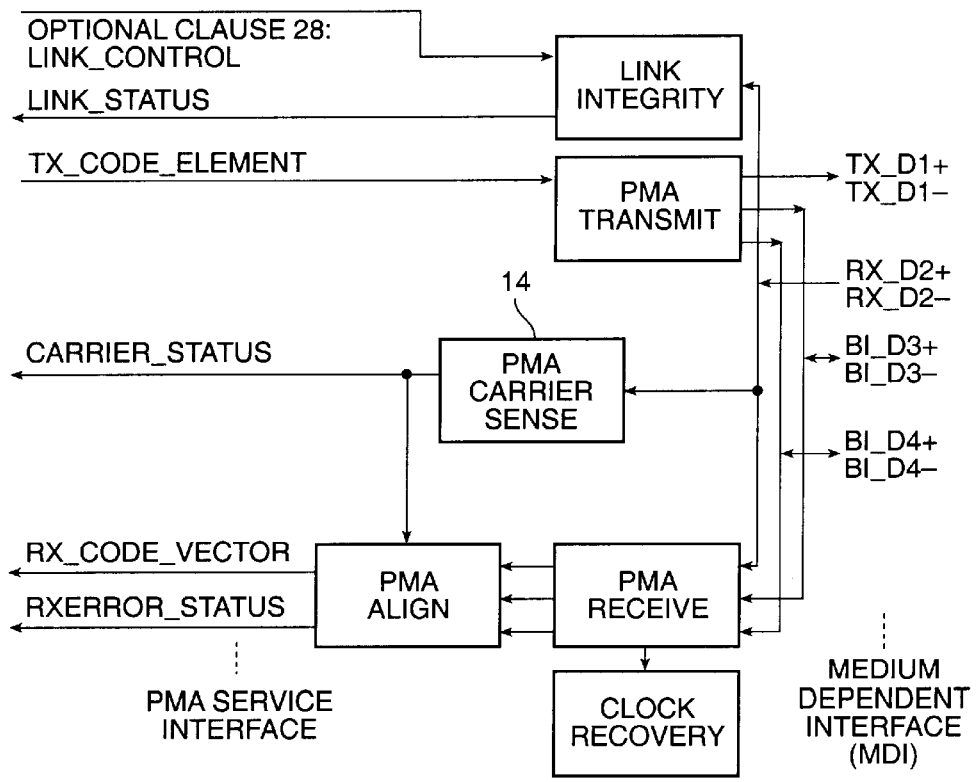
FIG. 8 is a block diagram showing the arrangement of certain signal paths within the PMA between the MDI interface and the PMA service interface.
Figure 9:
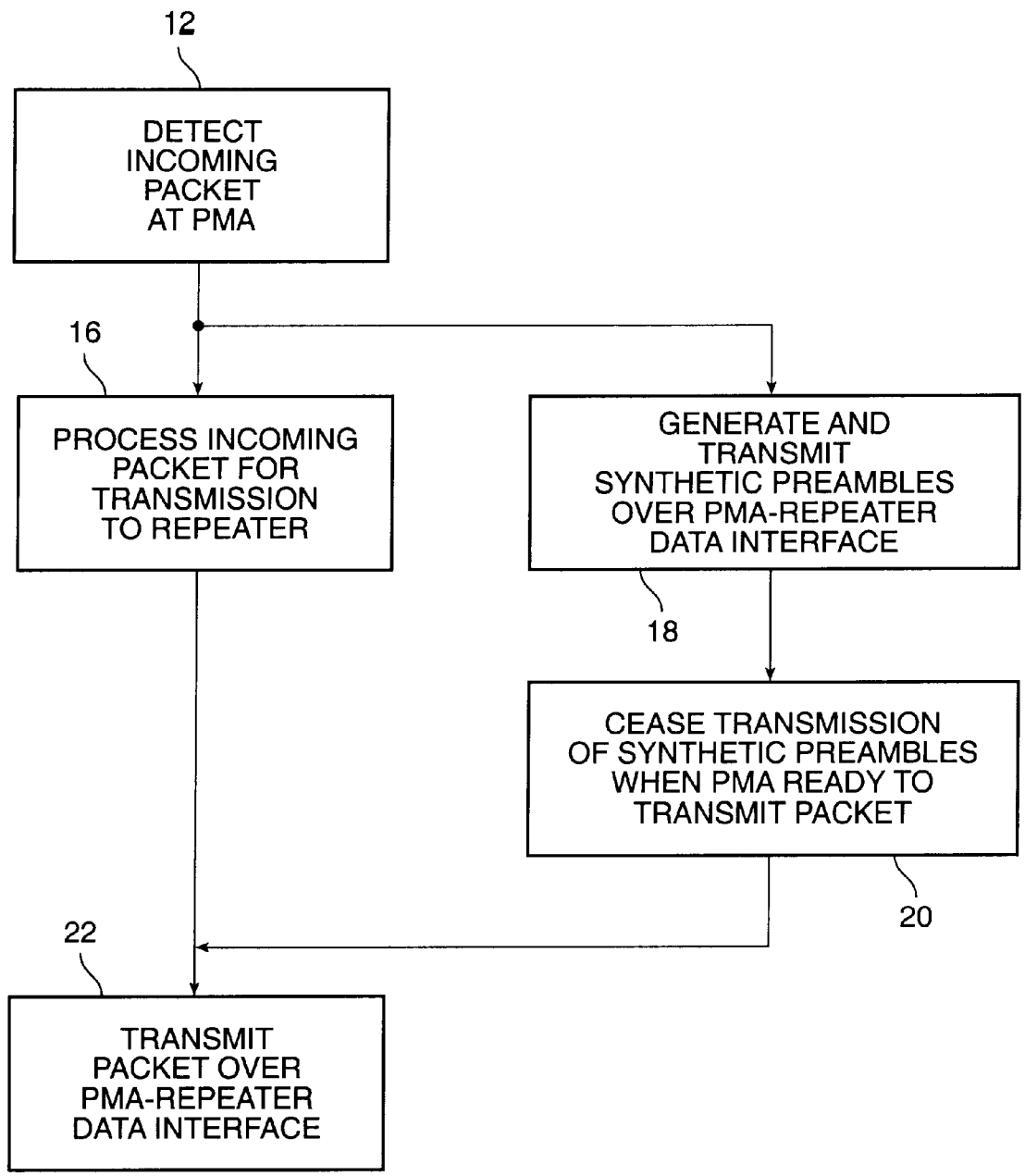
FIG. 9 is a block diagram of a method in accordance with a presently preferred embodiment of the present invention.

Turning to FIG. 9, a flow chart explaining the operational flow of signals according to a presently preferred embodiment of the present invention is shown. At block 12 an incoming packet is detected in the PMA. This corresponds to the PMA Carrier Sense function 14 (FIGS. 4 and 8) which generates the carrier_status signal within the PMA. The packet is processed for clock recovery and alignment in a conventional fashion at block 16. Simultaneously, after assertion of the carrier_status signal within the PMA, synthetic preamble signals are generated and sent over the PMA-Repeater Data Interface 10 at block 18. These signals are preferably sent continuously until ceased at block 20 upon completion of packet processing within the PMA. The packet is then transmitted over the PMA-Repeater Data Interface 10 at block 22 for repeating to other ports of the repeater.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A physical medium attachment device for use in a 100Base-T4 protocol compatible physical layer device, said physical medium attachment device, comprising:

a carrier sense detector that detects the receipt of an incoming packet by the physical layer device;

a clock recovery device that recovers a clock signal from said incoming packet;

an alignment device that aligns data corresponding to said incoming packet;

a synthetic preamble signal transmitter; and wherein said synthetic preamble signal transmitter repeatedly transmits said synthetic preamble signal until said alignment device completes the alignment of said data.

2. The physical medium attachment device of claim 1, wherein the physical layer device is used in a port within said 100Base-T4 protocol compatible repeater.

3. The physical medium attachment device of claim 1, wherein said repeater is a Clause 27 repeater.

4. A method of using synthetic preamble signals to minimize data collisions between ports and to awaken said ports, which are used in a 100Base-T4 protocol repeater, comprising:

detecting the receipt of a packet by one of the ports;

processing said packet for delivery to the other ports; and transmitting a synthetic preamble signal repeatedly until said packet is ready for delivery to the other ports.

5. The method of claim 4, wherein said one of the ports includes a physical layer device having a physical medium attachment.

6. The method of claim 4, wherein transmitting said synthetic preamble signal includes obtaining said synthetic preamble signal from a memory.

7. A program storage device readable by a machine, tangibly embodying a program of instructions executable by the machine to perform a method for causing a processor-based device to use at least one synthetic preamble signal to minimize data collisions between ports and to awaken said ports, which are used in a 100Base-T4 protocol repeater, the method comprising:

detecting the receipt of a packet by one of the ports;

processing said packet for delivery to the other ports; and transmitting said synthetic preamble signal repeatedly until said packet is ready for delivery to the other ports.

8. An electronic signal embodied in a carrier wave and representing sequences of instructions that, when executed by an electronic device, cause said electronic device to use at least one synthetic preamble signal to minimize data collisions between ports and to awaken said ports, which are used in a 100Base-T4 protocol repeater, by performing acts, comprising:

detecting the receipt of a packet by one of the ports;

processing said packet for delivery to the other ports; and transmitting a synthetic preamble signal repeatedly until said packet is ready for delivery to the other ports.

* * * * *